United States Patent [19]

Takikawa et al.

[11] Patent Number: 4,760,473
[45] Date of Patent: Jul. 26, 1988

[54] WRITE PROTECT SWITCH DEVICE

[75] Inventors: Makito Takikawa; Motohiro Shimaoka, both of Furukawa, Japan

[73] Assignee: Alps Electric Co., Ltd., Japan

[21] Appl. No.: 904,628

[22] Filed: Sep. 5, 1986

[30] Foreign Application Priority Data

Sep. 9, 1985 [JP] Japan .............................. 60-136816[U]

[51] Int. Cl.$^4$ .............................................. G11B 15/04
[52] U.S. Cl. ........................................................ 360/60
[58] Field of Search ................................... 360/60, 133

[56] References Cited

U.S. PATENT DOCUMENTS 4,040,106  8/1977  Medley .................................. 360/60

Primary Examiner—Vincent P. Canney
Attorney, Agent, or Firm—Guy W. Shoup; Leighton K. Chong

[57] ABSTRACT

A write protect switch device accommodated in a disk drive comprises an arm whose one end is supported by a frame of the disk drive, and a rotatable cam member supported by the other end of the arm, whose abutting end slides on a casing of a disk cartridge, the cam member displacing the other end of the arm in the direction of separating from the frame at the time of insertion of the disk cartridge; fitting into a write protect notch of the casing to displace the arm in the direction of approaching the frame when the abutting end arrives at the position of the notch; turning in the ejection direction of the disk cartridge with the arm kept close to the frame at the time of ejection; and after ejection, returning to the state before insertion of the disk cartridge. The write protect switch device also includes a spring for urging the whole arm inclusive of the cam member toward the frame, another spring for urging the cam member in the direction of rotating the same in the insertion direction of the disk cartridge, and switch means performing its switching action in response to the operation of the arm of approaching and separating from the disk cartridge. The cam member swings about the other end of the arm in response to the insertion/ejection movement of the disk to magnify and convert the amount of recess of the notch into the swing stroke of the arm about its one end.

4 Claims, 9 Drawing Sheets

WRITE PROTECT SWITCH DEVICE

BACKGROUND OF THE INVENTION

1. Field of the Invention

This invention relates to a write protect switch device for use with computers, word processors and the like, which is accommodated in a disk drive for performing recording and reproducing of information with respect to a magnetic disk encased in a casing and detects whether the magnetic disk is write-enabled or -disabled.

2. Description of the Prior Art

In systems of performing recording and reproducing of information with respect to a disk cartridge having a magnetic disk encased in its casing by means of a disk drive, various status detecting sensors and switches for checking the conditions of the disk and disk drive are equipped, such as an index sensor, write protect switch, track 00 switch, disk detecting switch, and door switch. Among them, the write protect switch is used to detect the presence/absence of a write protect notch formed in an outer marginal portion of the casing which indicates whether the disk may be written on. The write protect switch sets the system in a state wherein it can write information onto the disk only when the notch has been detected, whereby dissipation or destruction of recorded data is prevented from occurring.

FIG. 9 is a plan view of a 5¼ in. disk cartridge, this disk cartridge 10 comprises a flexible casing 10a and a flexible magnetic disk 10c encased in the former, and at given spots of the casing 10a are formed a spindle bore 10b, head insertion window 10e, index hole 10f, and write protect notch 10g. The write protect notch 10g is formed by cutting off a portion of given size at a given point from one margin on the side opposite to the side where the head insertion window 10e is formed. The system is designed so that as the disk cartridge 10 is inserted in the disk drive with the side of its head insertion window 10e headed and when the disk cartridge 10 arrives at a given load position (clamp position), a photosensor or a mechanical write protect switch composed of a micro switch located at the position of the write protect notch can detect the presence/absence of that notch 10g.

The write protect switch is generally made up by the use of, for example, a photosensor, reed switch, or micro switch, and in many cases, made up of the photosensor capable of detecting the notch 10g without need of contact. However, the write protect switch composed of the photosensor had the problem that it can hardly answer to a demand for cost reduction because the photosensor is high in part cost and large in power consumption.

Among mechanical switches which seemed to realize cost reduction, one write protect switch of the above kind used in the prior art is shown in FIG. 10, which comprises a micro switch 47 and a lever 60 swingable in response to the presence/absence of the write protect notch 10g. This lever 60 is made by an elastic member into the form of a single unit and urged elastically in the counterclockwise direction in the drawing about its base end portion 60a, a slide 47a of the micro switch 47 abuts on the back face (the under face in the drawing) of the lever 60, and in response to the swing of the lever 60 the switching action can be brought about. Specifically, while the disk cartridge 10 is being inserted and ejected an abutting portion 60b of the lever 60 slides on one side surface of the casing 10a thereby causing the lever 60 to locate at position A indicated by the one-dot chain line. During the above, the slide 47a is pushed into the body of the micro switch 47 to disable the disk from being written. When the disk cartridge 10 is inserted up to a given position and arrives at the clamp position, the write protect notch 10g moves to a position opposite to the abutting portion 60b of the lever 60, and if the portion of the notch 10g is vacant, the abutting portion 60b fits into the notch 10g and the lever 60 turns in the counterclockwise direction in the drawing. As a result, the slide 47a of the micro switch 47 projects, so that a signal indicating that the disk is writable is generated. Thus, writing onto the disk is enabled. On the contrary, if the abutting portion 60b cannot fit into the notch 10g and the micro switch 47 cannot be actuated when the abutting portion 60b of the lever 60 has arrived at the position of the notch 10g, writing is disabled even when the disk cartridge 10 has been loaded up to a given position. If it is desired to bring about this write-disabled state, a foil member B, for example, is bonded to the position of the notch 10g as indicated by the one-dot chain line in FIG. 9 to prevent the abutting portion 60b from fitting into the notch 10g. The Foil member B intercepts the path of light to disable writing on the disk.

According to the conventional mechanical write protect switch device configured as above, the depth of the write protect notch 10g was made to accord with the thickness of the casing 10a, so that the swing stroke of the lever 60 was very small and the stroke of the slide 47a reciprocated by the former was also small; thus, it was required to adjust the micro switch 47 very accurately. Consequently, to achieve accurate adjustment a very-long time was needed for adjustment at the time of assembly and/or after assembly, resulting in an increase in assembly cost. Further, to make the mechanism operate by a minute stroke while the abutting portion 60b is urged in the counterclockwise direction in the drawing by means of the slide 47a of micro switch 47 and the elasticity of the lever 60, the elastic portion (base end portion 60a) of the lever 60 was made comparatively rigid; thus, there resulted in a problem relating to the reliability of operation. In addition, there was a fear that the casing 10a would be pushed and deformed by the foregoing urging force when the abutting portion 60b slides on the casing 10a, and another fear was also that if some deformation appears the rotational characteristic of the disk would be degraded.

SUMMARY OF THE INVENTION

It is an object of the present invention to provide a write protect switch device which brings about a large stroke for the switching action of a micro switch, effects operation of the micro switch, and needs no peculiar adjustment of a switching position.

It is another object of the present invention to provide a write protect switch device which can work reliably even if the pushing force of an abutting portion sliding on a casing and fitting into a write protect notch is weak.

It is still another object of the present invention to provide a write protect switch device which is low not only in part cost, but also in assembly cost because adjustment of a micro switch is not required.

It is a still further object to provide a write protect switch device which does not deform a disk casing because the pushing force of an abutting portion is weak and the abutting portion slides softly on the casing.

To achieve the foregoing objects, the present invention resides in a write protect switch device accommodated in a disk drive capable of being set in a disk write-enabled state only when a write protect notch formed in a casing of a disk cartridge is detected, of the type provided with a micro switch and a working member for detecting the write protect notch to actuate the micro switch, which is characterized in that it comprises an arm whose one end is supported rotatably by a frame, a rotatable cam member supported by the other end of the arm, whose abutting end slides on one side surface of the casing at the time of insertion of the disk cartridge, which cam member displaces the end of the arm where the cam member is attached in the direction of separating from the frame at the time of sliding; fits into the write protect notch to displace the arm in the direction of approaching the frame when the abutting end arrives at the notch; turns in the ejection direction of the disk cartridge with the arm kept close to the frame at the time of ejection; and after ejection, returns to the state before insertion, a spring for urging the whole arm inclusive of the cam member toward the frame supporting the arm, another spring for urging the cam member in the direction of rotating the same in the insertion direction of the disk cartridge, and switch means performing its switching action in response to the operation of the arm of approaching and separating from the disk cartridge to generate a control signal for enabling writing onto a disk when the cam member has fitted into the notch, wherein the cam member swings about the other end of the arm in response to the insertion/ejection movement of the disk cartridge to magnify and convert the amount of recess of the notch into the swing stroke of the arm about its one end, and by the use of the swing (upward and downward movement with respect to the frame) of the arm, the switching action of the micro switch is brought about.

BRIEF DESCRIPTION OF THE DRAWINGS

FIG. 2 is a view showing the relation between an arm and a cam in which

FIG. 3 is an explanation view of the cam in which

FIG. 4 is an explanation view of the arm in which FIG. 4(a) is a vertical sectional view of FIG. 4(b);

DESCRIPTION OF THE PREFERRED EMBODIMENT

An embodiment of the present invention will now be described with reference to the drawings.

Figure 1:
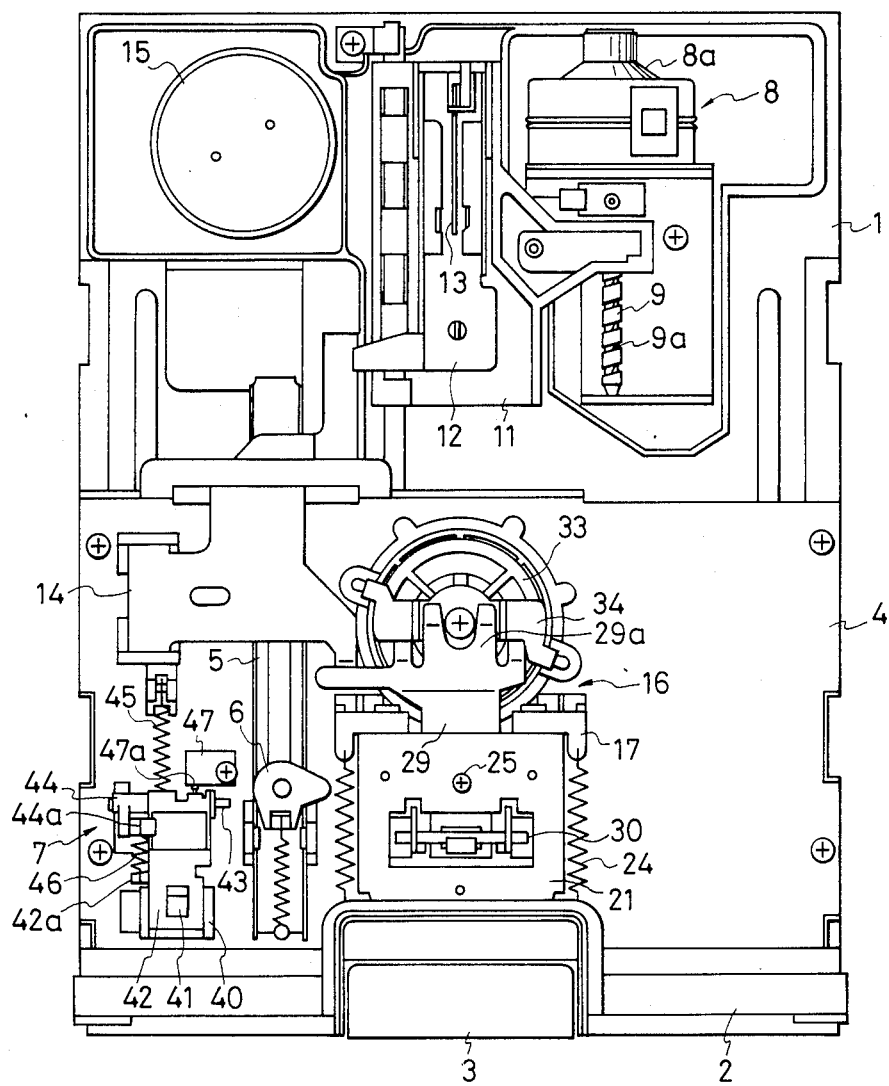
FIG. 1 is a plan view of a disk drive accommodating a write protect switch device according to an embodiment of the present invention.

FIG. 1 is a plan view of a disk drive accommodating a write protect switch device according to an embodiment of the present invention. In this drawing, the disk drive is composed mainly of a housing 1 made of aluminum die-casting, a front panel 2 molded by synthetic resin in the form of a single unit and fixed in front of the housing 1, a door 3 exposed in a center upper portion of the front panel 2 for opening and closing a disk insertion opening, a frame 4 attached to the upper side in the drawing of the housing 1 for supporting a write protect switch device 7; clamp mechanism 16; and the like hereinafter described, a drive motor 15 for driving and rotating a disk driving spindle, and a shift mechanism 8 for shifting a cartridge 11 with a magnetic head not shown mounted thereon in the radial direction of a disk.

The clamp mechanism is composed mainly of a flat spring-like clamp arm 29 whose front end is supported by the frame 4 rotatably about a shaft 30, a rotary frame 21 whose rear end is supported by the frame 4 rotatably about a shaft not shown, a support plate 34 hung by an arm portion 29a at the point of the clamp arm 29, a hub 33 attached rotatably to the support plate 34 for performing centering and clamping of the disk, and a door plate 17 having the door 3 attached to its point. The rotary frame 21 supports the door plate 17 slidably in the insertion/ejection direction of the disk, and between the door plate 17 and rotary frame 21 is provided a slide spring 24 for urging the door plate 17 toward the door 3 relative to the rotary frame 21. A screw member 25 threaded into a portion of the rotary frame 21 on the side of the hub 33 abuts on the upper surface of the clamp arm 29 so that it pushes the clamp arm 29 toward the disk in response to the turn of the door plate 17 toward the disk at the time of closure of the door 3 to thereby shift the hub 33 toward the spindle not shown; thus, the disk is held rotatably between the spindle and the hub 33.

The shift mechanism 8 is composed of a stepping motor 8a secured to the housing 1 on the side opposite to the front panel 2 and a screw shaft 9 provided coaxially with the stepping motor 8a and having a groove 9a formed in its periphery, so that in response to the rotation of the stepping motor 8a the carriage 11 can be shifted reciprocatingly in the radial direction of the disk by the action of a coupling piece not shown provided on the carriage 11 and coupled to the groove 9a.

The carriage 11 having the magnetic head mounted thereon supports at its base end portion rotatably an arm 12 which is urged toward the carriage 11 by means of a spring 13 and provided with a pad for pressing the disk against the magnetic head at the time of clamping. This arm 12 is stopped by an arm supporting plate 14 which is pulled up by the action of a spring not shown at the time of unclamping the disk, so that the arm 12 is caused to approach/separate from the disk by the upward/downward movement of the arm supporting plate 14.

Between the disk clamp mechanism 16 and the write protect switch device 7 provided on the upper surface of the frame 4, there are provided an eject board 5 slidable on the frame 4 and a cam 6 supported rotatably by an upper portion of the eject board 5 on the side of the front panel 2, for performing the ejection action against the disk.

Figure 2A:
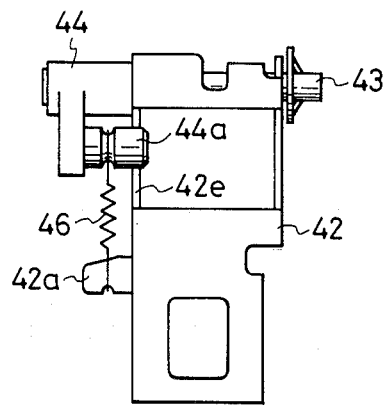
FIG. 2(a) is a plan view.
Figure 2B:
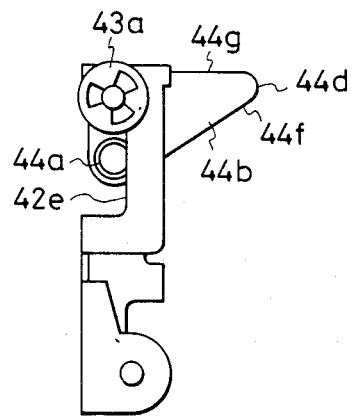
FIG. 2(b) is a side view.
Figure 2C:
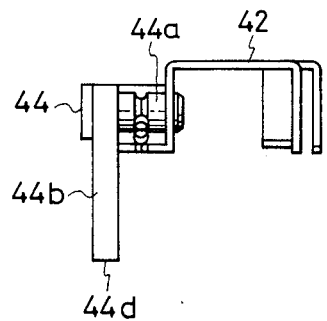
FIG. 2(c) is a front view.
Figure 5:
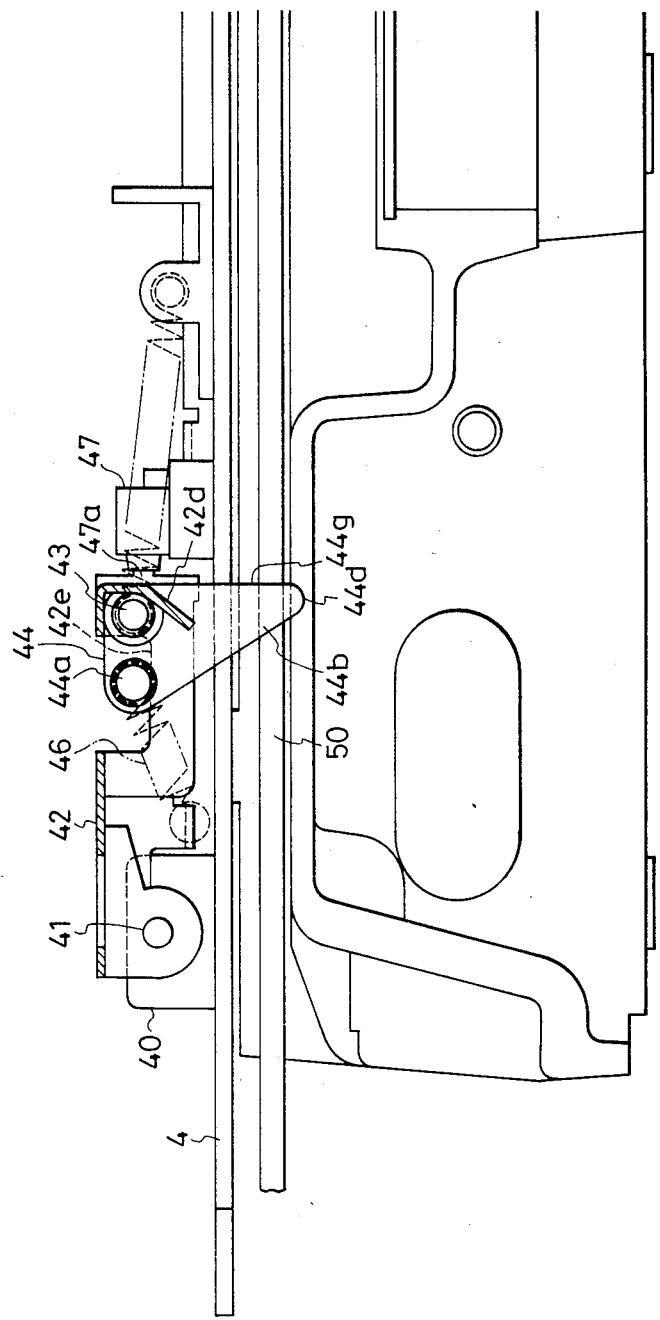
FIG. 5 is a sectional view of an important portion of the write protect switch device, showing the initial state before insertion of a disk cartridge.

The write protect switch device 7 is composed, as shown in FIGS. 1, 2 and 5, of an arm 42 whose one end is supported swingably by a shaft 41 of a mounting plate 40 provided on the upper surface of the frame 4, a cam 44 supported rotatably by a shaft 43 at the other end of the arm 42, a spring 45 whose one end is coupled to a portion of the arm 42 on the mounted side of the cam 44 with the other end coupled to a portion of the upper surface of the frame 4 for urging the arm 42 inclusive of the cam 44 toward the frame 4, i.e. in the clockwise direction about the shaft 41 in FIG. 5, a spring 46 whose one end is coupled to a projection 44a of the cam 44 on the side of the front panel 2 with the other end coupled to a projection 42a projecting from the side surface of the arm 42 for urging the cam 44 so as to turn in the disk insertion direction, i.e. in the counterclockwise direction about the shaft 45 in FIG. 5, and a micro switch 47 positioned opposite to the arm 42 on the side of the arm supporting plate 14.

Figure 3A:
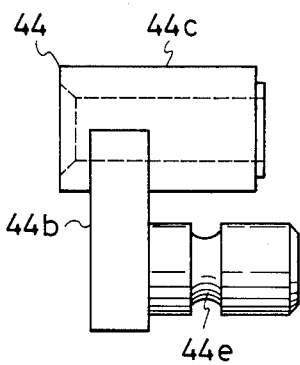
FIG. 3(a) is a plan view.
Figure 3B:
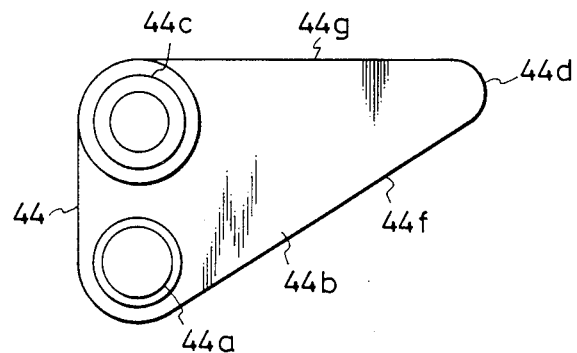
FIG. 3(b) is a side view.
Figure 3C:
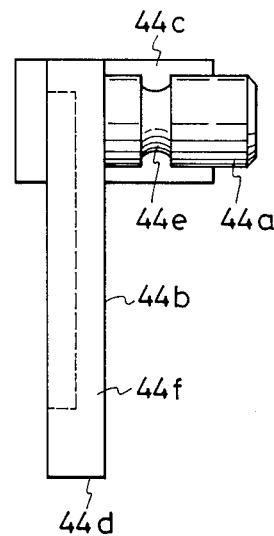
FIG. 3(c) is a front view.
Figure 4A:
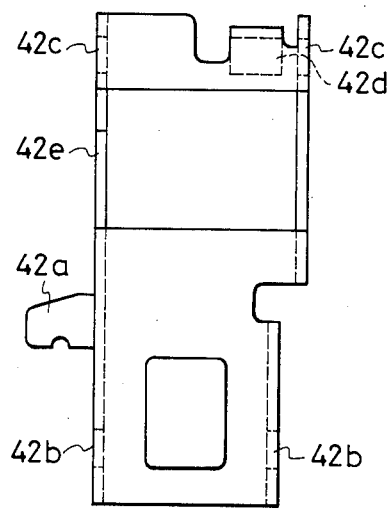
FIG. 4(a) is a plan view.
Figure 4B:
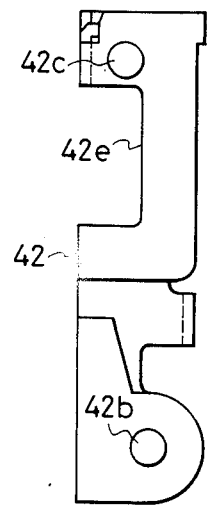
FIG. 4(b) is a side view.
Figure 4C:
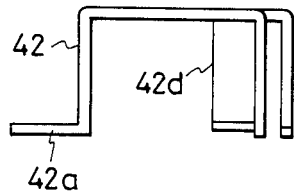
FIG. 4(c) is a front view.
Figure 4D:
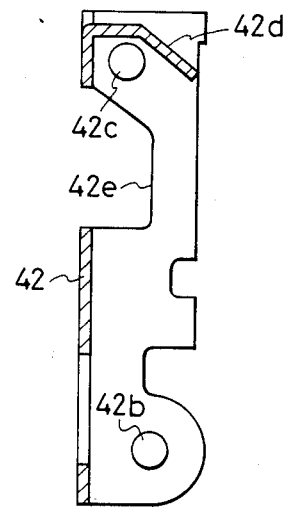

As shown in FIG. 3, the cam 44 is composed of a substantially triangular cam body 44b, a sleeve 44c formed at an upper top of the cam body 44b on the side of the arm supporting plate 14, and a projection 44a projecting from an upper top of the same on the side of the front panel 2 toward the rotary frame 21, these being molded into a single unit. The lower top of the cam body 44b is slidable on the casing 10a of the disk cartridge 10 and forms an abutting portion 44d which is fitable into a write protect notch 10g, that is, this abutting portion projects through a gap not shown of the frame 4 into the disk insertion opening and is located at a position where it can fit into the notch 10g. One end of the spring 46 is coupled to a linkage groove 44e of the projection 44a.

As shown in FIG. 4, the arm 42 has shaft insertion holes 42b and 42c in its respective end portions into which the shafts 41 and 45 are inserted rotatably and which are bored in either marginal portion being formed by bending a plate member, and has further the projection 42a formed integrally on its side corresponding to the side of the housing 1 to which the spring 4b is coupled. As shown clearly in the sectional view of FIG. 4(a), on the under surface of the end portion of the arm 42 opposite to the arm supporting plate 14 there is formed a pushing portion 42a which can push a slide 47a of the micro switch 47 in response to the upward/downward movement of the arm 42 to cause the switching operation. This pushing portion 42d has an inclined surface so as to be able to push the slide 47a at the time of downward movement (when it is displaced in the direction of approaching the frame 4) and to remove the pushing force from the slide 47a at the time of upward movement (when it is displaced in the direction of separating from the frame 4).

To the shaft 43 inserted in the shaft insertion holes 42c at one end of the arm 42 on the side of the arm supporting plate 14, the sleeve 44c of the cam 44 is fitted rotatably and a toothed lock washer 43b is attached to lock and prevent the shaft 43, cam 44, and arm 42 from being disassembled. To this shaft 43 is coupled one end of the spring 45 as shown in FIGS. 1 and 5. In a portion of the arm 42 closer to the front panel 2 than is the shaft insertion holes 42c there is formed a concave portion 42e which comes into engagement with a portion of the projection 44a of the cam 44, and thus, serves as a stopper for restricting the rotational position of the cam 44.

The operation of the write protect switch device 7 configured as above will now be described with reference to the drawings. FIGS. 5 through 8 are explanatory of the operation of the write protect switch device 7.

FIG. 5 shows the state wherein the disk cartridge 10 is not inserted in the disk drive. In this state, because there exists nothing in a disk insertion path 50, the abutting portion or end 44d of the cam body 44b of the cam 44 has been lowered up to the position where the lower end of the pushing portion 42d of the arm 42 abuts on the upper surface of the frame 4, and the slide 47a of the micro switch 47 is pushed and kept in the ON state. However, because the disk cartridge 10 is not inserted, the system cannot perform recording and reproducing even if the door 3 is closed. Further, the cam 44 is standing in the balanced state in which the elastic force of the spring 46 is minimal, namely, the amount of extension of the spring 46 is minimal. That is, the projection 44a of the cam 44 is in abutment on the concave portion 42e of the arm 42, whereby the rotational position in the counterclockwise direction in FIG. 5 of the cam 44 is restricted.

Figure 6:
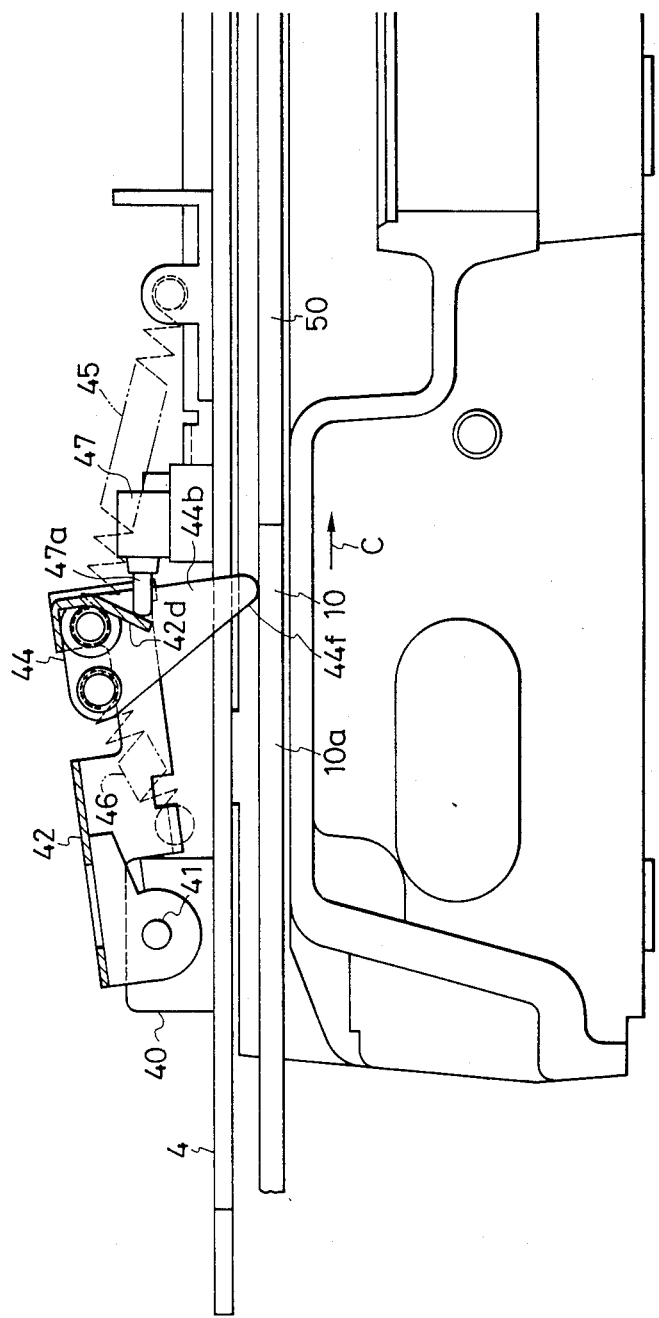
FIG. 6 is also a sectional view of the important portion, showing the state immediately after insertion of the disk cartridge.

In the foregoing state, as the disk cartridge 10 is inserted through the disk insertion opening of the disk drive with its door 5 opened into the disk insertion path 50, the point of the disk cartridge 10 abuts on an inclined surface 44f of the cam body 44b, as shown in FIG. 6, and with an advance of insertion, the inclined surface 44f is pushed in the disk insertion direction (the direction of the arrow C shown in the drawing). But, the cam 44 cannot turn further because the extent of rotation of the cam body 44b is restricted by the projection 44a and the concave portion 42e of the arm 42. However, on the other hand, because the arm 42 is supported swingably by the shaft 41 and urged toward the frame 4 by means of the spring 45, the arm 42 turns about the shaft 41 in the counterclockwise direction in FIG. 6 with an advance of insertion of the disk cartridge 10, and the abutting end 44d of the cam body 44b rides on the upper surface of the casing 10a of the disk cartridge 10. Then, as the disk cartridge 10 is inserted further, only the abutting end 44d slides on the upper surface of the casing 10a with the conditions of the arm 44 and cam 42 unchanged. As a result, the pushing portion 42d of the arm 42 separates from the slide 47a of the micro switch 47, whereby the micro switch 47 is changed to the OFF state.

Figure 7:
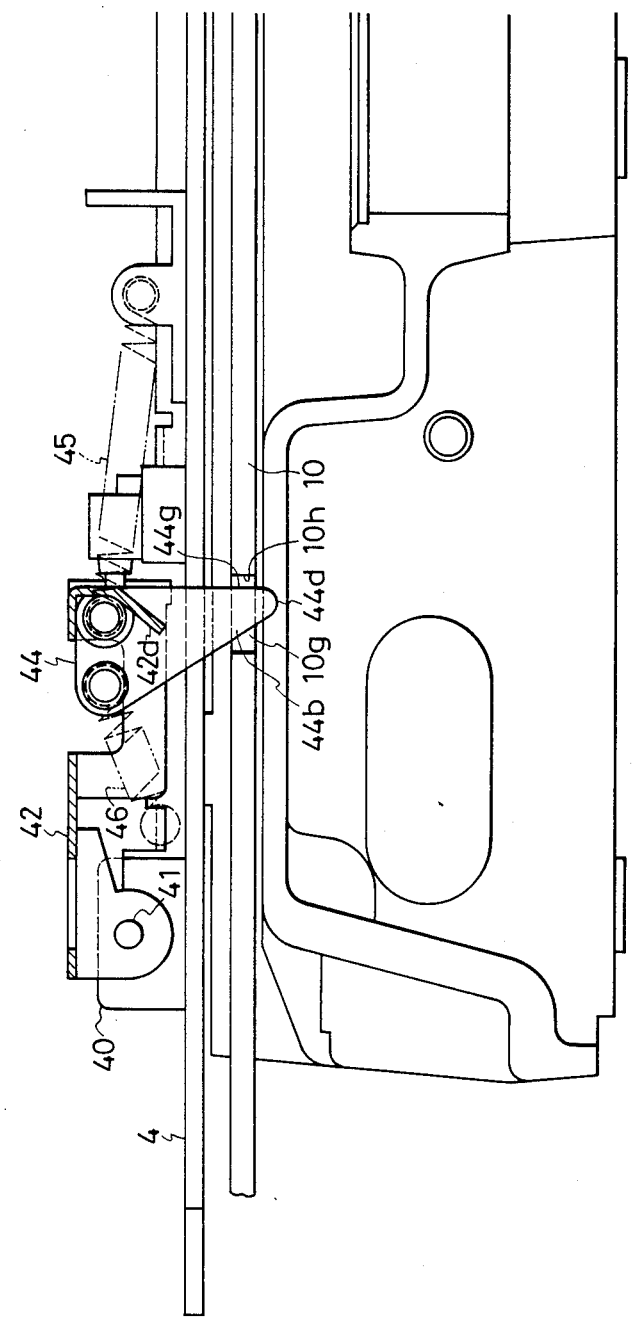
FIG. 7 is also a sectional view of the important portion, showing the state when a write protect notch has been detected.

When the disk cartridge 10 is inserted completely and reaches up to the given clamp position, the write protect notch 10g comes just to the position directly below the abutting end 44d of the cam body 44b. At this moment, because the arm 42 is urged in the clockwise direction in the drawing about the shaft 41, the abutting end 44d fits into the write protect notch 10g, as shown in FIG. 7, and the arm 42 also turns in the clockwise direction in the drawing. In the course of turn (downward movement) the pushing portion 42d of the arm 42 pushes gradually the slide 47a of the micro switch 47, and when it comes to the most-lowered position (the position where the arm 42 abuts on the frame 4), the maximum pushing stroke results. During the foregoing process the micro switch 47 changes to the ON state, whereby writing onto the disk is enabled.

Figure 8:
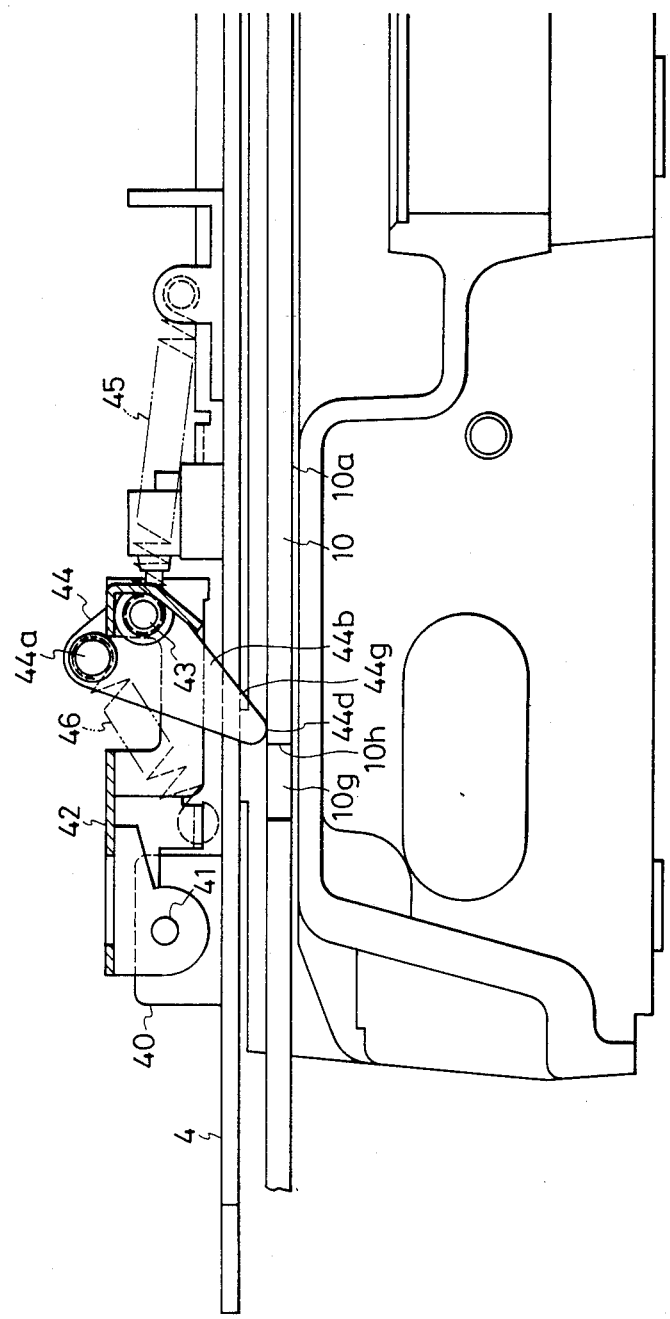
FIG. 8 is also a sectional view of the important portion, showing the state at the time of ejection of the disk cartridge.
Figure 9:
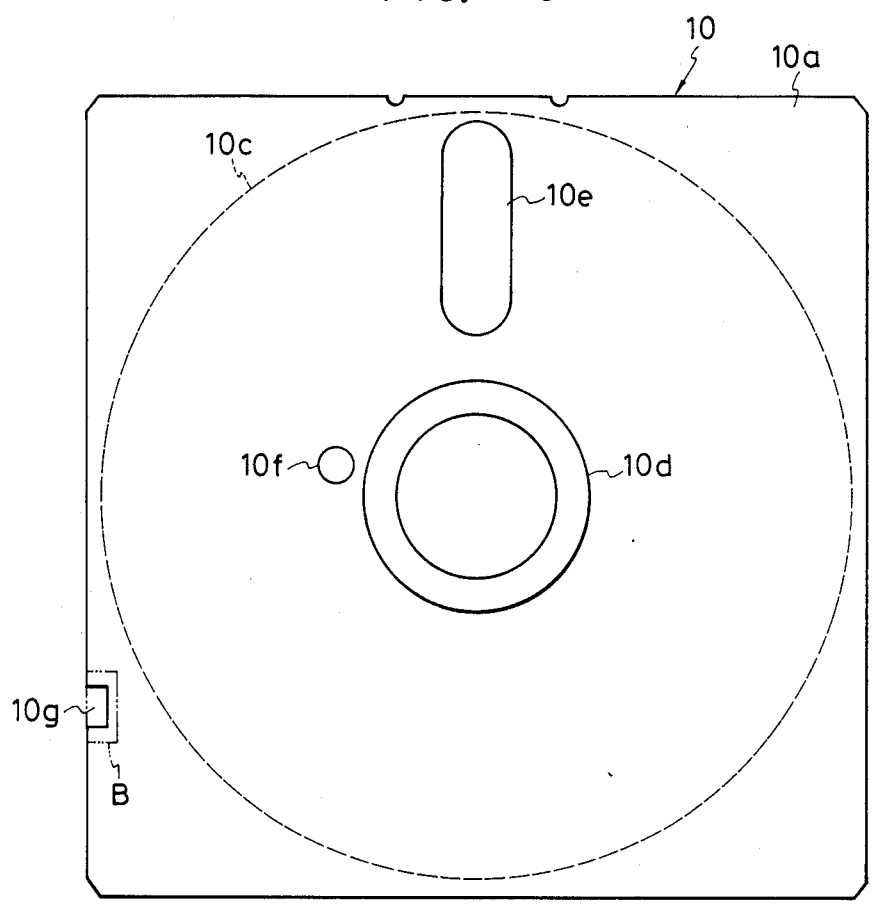
FIG. 9 is a plan view of the disk cartridge.
Figure 10:
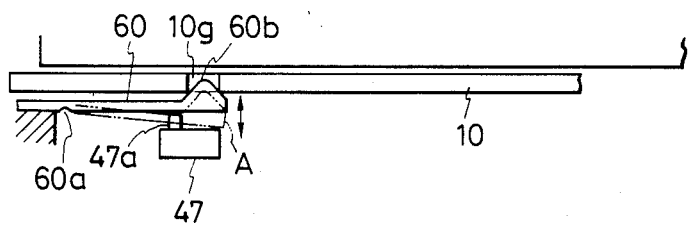
FIG. 10 is an explanation view of the conventional write protect switch.

After recording and/or reproducing is terminated and as the door 3 is opened and it is started to pull out the disk cartridge 10, a vertical surface 44g of the cam body 44b abuts on a surface 10h of the write protect notch 10g on the side of the carriage 11. With an advance of pulling out, the cam body 44b turns about the shaft 43 in the clockwise direction in the drawing and finally, as shown in FIG. 8, the abutting end 44d climbs over that surface 10h of the write protect notch 10g and slides on the upper surface of the casing 10a of the disk cartridge 10. Then, as the ejection of the disk cartridge 10 is completed, the cam body 44b turns about the shaft 43 in the counterclockwise direction in the drawing by the action of the spring 46, and the state before insertion of the disk cartridge shown in FIG. 5 is recovered. In the thus attained state, the slide 47a of the micro switch 47 is kept in the pushed state and the switch in the ON state; but, writing is disabled because the disk cartridge 10 has been ejected.

The foregoing process of operation relates to the case wherein the cam body 44b detects the write protect notch 10g and moves down to cause the switching action to thereby enable writing. As referred to in the description of the prior art, if the foil member B, for example, is bonded to the write protect notch 10g to close up this notch 10g, the cam body 44b and arm 42 are confined in the state shown in FIG. 6, the micro switch 47 cannot turn on, and it is impossible to perform writing onto the disk even when the disk cartridge 10 has been inserted.

As described hereinabove, by the use of the cam 44 and arm 42 the write protect notch 10g is detected to judge whether the disk is write-enabled or -disabled. Because the cam 44 and arm 42 perform their respective periodical actions in response to insertion/ejection of the disk cartridge 10 and in correlation with the position of the same, the swing action of the arm 42 about the shaft 41 can take place reliably, and in response to this swing action, the switching action of the micro switch 47 can take place reliably.

Although the depth of the write protect notch 10g is identical with the thickness of the casing 10a, by enlarging the stroke in the thicknesswise direction by the use of the substantially triangular cam body and by making use of the swing action of the arm 42, the slide 47a of the micro switch 47 can be disposed in parallel with the insertion/ejection direction of the disk cartridge 10 and this can contribute to making thin the disk drive. Further, because the pushing stroke against the slide 47a is large, the micro switch 47 can achieve its function fully within the extent of part tolerance by attaching simply the same to a given spot without need of special and accurate adjustment of the disposed location of the micro switch 47 or of the switching position of the slide 47a. In addition, because an intended action takes place reliably even when the elastic strength of the springs 45 and 46 is weak, there is no fear that the casing 10a would be damaged by the pushing force of the abutting end 44d, and there is no anxiety that the characteristics of the system would be degraded in driving the disk.

Although in the foregoing embodiment the write protect switch device 7 is provided on the upper surface of the frame 4, this switch device may be disposed under the frame 4, i.e. inside the disk drive.

The write protect switch device so configured as above of the present invention has the following effects:

(1) Because the switch device is of the mechanical type, the part cost is low and the consumption power is small.

(2) Because the pushing stroke against the micro switch is large, accurate adjustment is not required for the micro switch; thus, the assembly cost is low.

(3) Because a large working stroke is created by the cam, the operation is reliable.

(4) Because the present switch device functions surely even with a weak pushing force, there is no fear that the casing of the disk cartridge would be damaged and there appears no degradation of the rotational characteristics of the disk.

What is claimed is:

1. A write protect switch device accommodated in a disk drive, of the type wherein a working member is displaced through fitting into a write protect notch formed in a casing of a disk cartridge and the displacement of the working member is detected by switch means to check the presence/absence of the notch to thereby control whether writing onto a disk is to be enabled or disabled, which comprises an arm whose one end is supported rotatably by the side of a frame of the disk drive, a rotatable cam member supported by the other end of said arm, whose abutting end slides on one side surface of the casing at the time of insertion and ejection of the disk cartridge, which cam member displaces the other end of said arm where said cam member is attached in the direction of separating from the frame at the time of insertion; fits into the notch to displace said arm in the direction of approaching the frame when said abutting end arrives at a position opposite to the notch; turns in the ejection direction of the disk cartridge with said arm kept close to the frame at the time of ejection; and after ejection, returns to the state before insertion of the disk cartridge, a spring for urging the whole arm inclusive of said cam member toward the frame, another spring for urging said cam member in the direction of rotating the same in the insertion direction of the disk cartridge, and switch means performing its switching action in response to the operation of said arm of approaching and separating from the disk cartridge.

2. A write protect switch device according to claim 1, wherein said cam member is of a substantially triangular shape whose first top is coupled rotatably to the other end of said arm, with the second top serving as said abutting end and fitable into the notch, and the third top having a projection for restricting the rotation of said cam member about said first top in conjunction with a concave portion of said arm.

3. A write protect switch device according to claim 1, wherein said switch means is a micro switch.

4. A write protect switch device according to claim 1, wherein said arm has a pushing portion with an inclined surface for actuating said switch means.

* * * * *